United States Patent
Rupnik et al.

(10) Patent No.: US 11,061,145 B2
(45) Date of Patent: Jul. 13, 2021

(54) SYSTEMS AND METHODS OF ADJUSTING POSITION INFORMATION

(71) Applicant: THE BOEING COMPANY, Chicago, IL (US)

(72) Inventors: Brian K. Rupnik, Lake Stevens, WA (US); Brian T. Whitehead, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 340 days.

(21) Appl. No.: 16/195,669

(22) Filed: Nov. 19, 2018

(65) Prior Publication Data

US 2020/0159224 A1    May 21, 2020

(51) Int. Cl.
*G01S 19/49* (2010.01)
*G01S 19/40* (2010.01)
(Continued)

(52) U.S. Cl.
CPC ............ *G01S 19/49* (2013.01); *G01C 21/005* (2013.01); *G01C 21/16* (2013.01); *G01C 21/165* (2013.01); *G01C 21/28* (2013.01); *G01C 21/3602* (2013.01); *G01C 21/3644* (2013.01); *G01S 19/03* (2013.01); *G01S 19/07* (2013.01); *G01S 19/25* (2013.01); *G01S 19/252* (2013.01); *G01S 19/40* (2013.01); *G01S 19/41* (2013.01); *G01S 19/47* (2013.01); *G01S 19/485* (2020.05);
(Continued)

(58) Field of Classification Search
CPC ........ G01S 19/49; G01S 19/485; G01S 19/47; G01S 19/252; G01S 19/41; G01S 19/25; G01S 19/07; G01S 19/03; G01S 19/40; G01S 17/933; G01C 21/16; G01C 21/165; G01C 21/28; G01C 21/005; G01C 21/3644; G01C 21/3602; G01C 21/20; G01C 23/005; G05D 1/0202
See application file for complete search history.

(56) References Cited

U.S. PATENT DOCUMENTS

| | | | | |
|---|---|---|---|---|
| 5,208,757 A | * | 5/1993 | Appriou et al. | G01C 21/005 701/23 |
| 6,064,942 A | * | 5/2000 | Johnson et al. | G01C 21/005 701/469 |

(Continued)

*Primary Examiner* — Dale W Hilgendorf
(74) *Attorney, Agent, or Firm* — Moore Intellectual Property Law, PLLC

(57) ABSTRACT

A system includes a memory and a processor. The memory is configured to store map data indicating positions of landmarks. The processor is configured to receive image data from an image sensor. The processor is also configured to determine, based on the image data, a first estimate of a position, relative to the image sensor, of a landmark identified in the map data. The processor is configured to determine orientation of the image sensor based on inertial measurement unit measurements. The processor is also configured to determine, based on position information, the orientation, and the map data, a second estimate of the position of the landmark. The processor is configured to determine position offset data based on a comparison of the first estimate and the second estimate. The processor is also (Continued)

configured to generate, based on the position offset data and the position information, an output indicating an adjusted position.

20 Claims, 9 Drawing Sheets

(51) Int. Cl.

| | |
|---|---|
| *G01C 21/36* | (2006.01) |
| *G01S 19/03* | (2010.01) |
| *G01S 19/25* | (2010.01) |
| *G01S 19/41* | (2010.01) |
| *G01S 19/07* | (2010.01) |
| *G01S 19/47* | (2010.01) |
| *G01S 19/48* | (2010.01) |
| *G01C 21/28* | (2006.01) |
| *G01C 21/16* | (2006.01) |
| *G01C 21/00* | (2006.01) |
| *G05D 1/02* | (2020.01) |
| *G01C 23/00* | (2006.01) |
| *G01S 17/933* | (2020.01) |
| *G01C 21/20* | (2006.01) |

(52) U.S. Cl.
CPC ........... *G01C 21/20* (2013.01); *G01C 23/005* (2013.01); *G01S 17/933* (2013.01); *G05D 1/0202* (2013.01)

(56) References Cited

U.S. PATENT DOCUMENTS

| | | | |
|---|---|---|---|
| 7,773,799 | B2 | 8/2010 | Oldroyd |
| 2007/0030172 | A1* | 2/2007 | Bandy et al. ......... G01C 23/005 340/945 |
| 2010/0157127 | A1 | 6/2010 | Takayanagi et al. |
| 2011/0054791 | A1* | 3/2011 | Surampudi et al. ......... G01C 21/005 701/472 |
| 2011/0282580 | A1 | 11/2011 | Mohan |
| 2012/0176491 | A1* | 7/2012 | Garin et al. ............ G01S 19/49 348/113 |
| 2015/0094089 | A1* | 4/2015 | Moeglein et al. ... G01C 21/165 455/456.1 |
| 2016/0377437 | A1* | 12/2016 | Brannstrom ......... G05D 1/0278 701/501 |
| 2017/0008521 | A1* | 1/2017 | Braunstein et al. ......... G01C 21/3644 |
| 2017/0208251 | A1* | 7/2017 | Shamir et al. ....... G01C 21/165 |
| 2018/0259341 | A1* | 9/2018 | Aboutalib et al. ... G01C 21/005 |
| 2019/0204455 | A1* | 7/2019 | Yao ......................... G01S 19/49 |
| 2020/0005635 | A1* | 1/2020 | Nagata et al. .......... G01C 21/28 |
| 2020/0124421 | A1* | 4/2020 | Kang et al. ............. G01S 19/07 |
| 2020/0125859 | A1* | 4/2020 | Sagong .................. G01S 19/40 |

* cited by examiner

SYSTEMS AND METHODS OF ADJUSTING POSITION INFORMATION

FIELD OF THE DISCLOSURE

The present disclosure is generally related to systems and methods of adjusting position information.

BACKGROUND

Position information from positioning systems, such as a global positioning system (GPS), is used to estimate a location of a device (e.g., a vehicle). GPS employs satellites that broadcast signals which can be received by a GPS receiver. The GPS receiver makes range measurements based on the GPS signals generated by the satellites. An intersection of the multiple range measurements is used to determine an estimated position of the device. The range measurements can contain errors related to unsynchronized operation of the satellites and user clocks, errors in the received GPS signals, errors related to atmospheric propagation delays, or a combination thereof. The errors in range measurements can reduce the accuracy of the estimated position.

SUMMARY

In a particular implementation, a system includes a memory and a processor. The memory is configured to store map data indicating positions of a plurality of landmarks. The processor is configured to receive position information from a positioning system. The processor is also configured to receive inertial measurement unit (IMU) measurements from an IMU. The processor is further configured to receive image data from an image sensor. The processor is also configured to determine, based on the image data, a first estimate of a position, relative to the image sensor, of a landmark identified in the map data. The processor is further configured to determine orientation of the image sensor based on the IMU measurements. The processor is also configured to determine, based on the position information, the orientation, and the map data, a second estimate of the position of the landmark relative to the image sensor. The processor is further configured to determine position offset data based on a comparison of the first estimate and the second estimate. The processor is also configured to generate, based on the position offset data and the position information, an output indicating an adjusted position.

In another particular implementation, a method of correcting position information includes receiving, at a device, position information from a positioning system. The method also includes receiving, at the device, inertial measurement unit (IMU) measurements from an IMU. The method further includes receiving, at the device, image data from an image sensor. The method also includes accessing map data indicating positions of a plurality of landmarks. The method further includes determining, at the device, a first estimate of a position, relative to the image sensor, of a landmark identified in the map data, the first estimate based on the image data. The method also includes determining, at the device, orientation of the image sensor based on the IMU measurements. The method further includes determining, at the device, a second estimate of the position of the landmark relative to the image sensor, the second estimate based on the position information, the orientation, and the map data. The method also includes determining, at the device, position offset data based on a comparison of the first estimate and the second estimate. The method further includes generating, at the device, an output indicating an adjusted position, the adjusted position based on the position offset data and the position information.

In another particular implementation, a computer-readable storage device stores instructions that, when executed by a processor, cause the processor to perform operations including receiving position information from a positioning system. The operations also include receiving inertial measurement unit (IMU) measurements from an IMU. The operations further include receiving image data from an image sensor. The operations also include accessing map data indicating positions of a plurality of landmarks. The operations further include determining, based on the image data, a first estimate of a position, relative to the image sensor, of a landmark identified in the map data. The operations also include determining orientation of the image sensor based on the IMU measurements. The operations further include determining, based on the position information, the orientation, and the map data, a second estimate of the position of the landmark relative to the image sensor. The operations also include determining position offset data based on a comparison of the first estimate and the second estimate. The operations further include generating, based on the position offset data and the position information, an output indicating an adjusted position.

The features, functions, and advantages described herein can be achieved independently in various implementations or may be combined in yet other implementations, further details of which can be found with reference to the following description and drawings.

DETAILED DESCRIPTION

Figure 1:
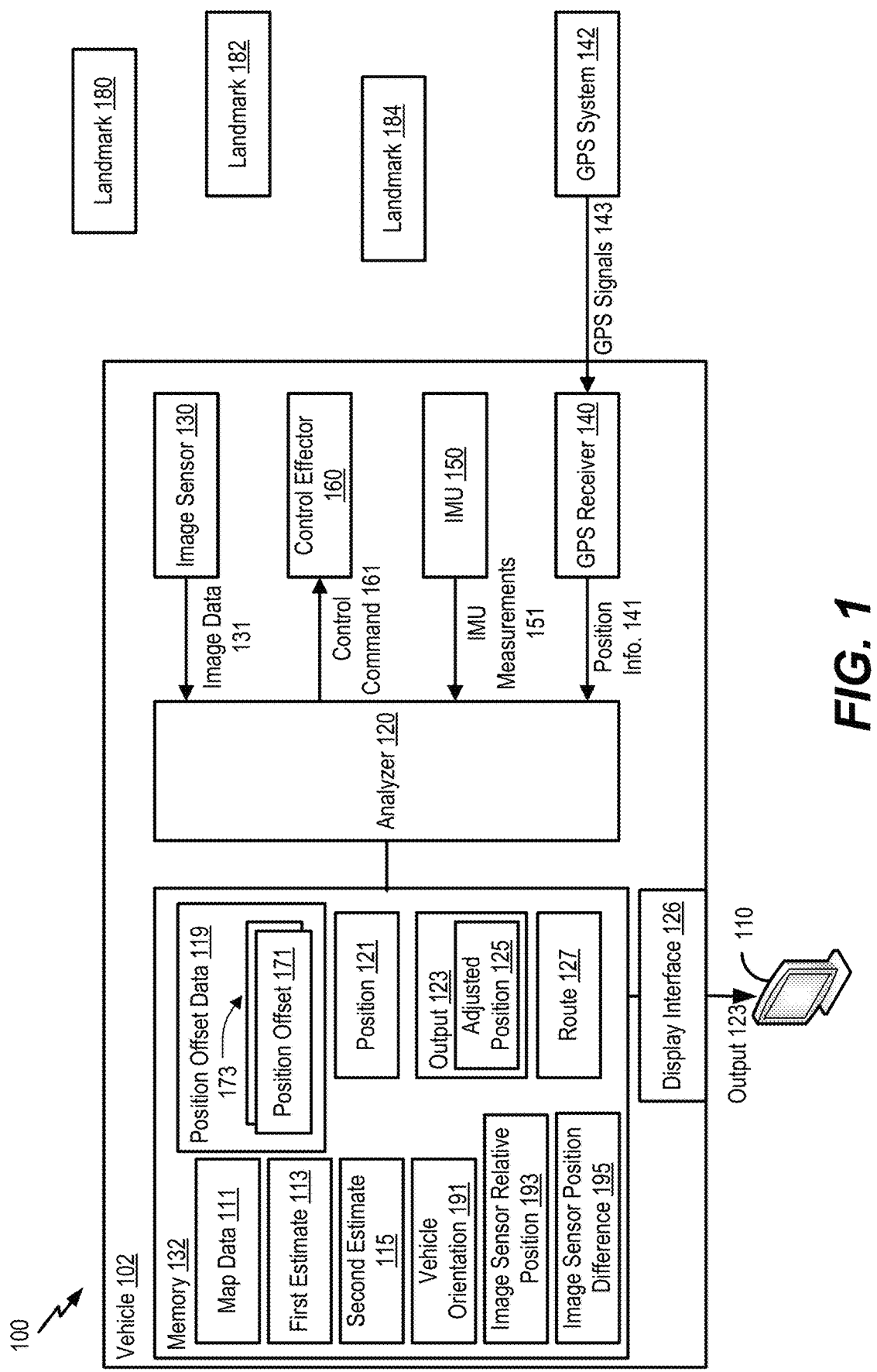
FIG. 1 is a block diagram that illustrates a system operable to adjust position information.

Implementations described herein are directed to systems and methods of adjusting position information. A vehicle includes an analyzer, a global positioning system (GPS) receiver, an image sensor, and an inertial measurement unit (IMU). The vehicle includes, for example, at least one of an aircraft, a boat, a truck, a train, a car, a manned vehicle, or an unmanned vehicle. The analyzer receives position information from the GPS receiver. The position information indicates a GPS position (e.g., GPS coordinates or other coordinates) of an estimated location of the GPS receiver. The image sensor captures an image of landmarks proximate to the vehicle and provides image data to the analyzer. The analyzer also receives IMU measurements from the IMU. For example, the IMU measurements indicate a vehicle orientation (e.g., a heading, a roll attitude, a pitch attitude, or a combination thereof) of the vehicle. In some implementations, one or more components of the analyzer, the GPS receiver, the image sensor, the IMU, or a combination thereof, are included in a device, such as a phone, a communication device, a navigation device, or a combination thereof. In these implementations, the IMU measurements indicate a device orientation (e.g., a heading, a roll attitude, a pitch attitude, or a combination thereof) of the device.

The analyzer identifies a landmark (e.g., a control tower) in the image data. The analyzer determines, based on the image data and map data, a first estimate (e.g., an image-based estimate) of a position of the landmark relative to the image sensor (e.g., 10 feet ahead of the image sensor), as described herein. The first estimate indicates a detected position of the landmark relative to the image sensor. The analyzer determines that the map data indicates a map position of the landmark. The analyzer determines, based on the map position of the landmark and the GPS position of the GPS receiver, a second estimate (e.g., a GPS-based estimate) of the position of the landmark relative to the image sensor. For example, the analyzer determines, based at least in part on the IMU measurements, a position of the image sensor relative to the GPS receiver, as described herein. To illustrate, configuration data indicates an image sensor relative position that is relative to the GPS receiver in a vehicle frame of reference. The analyzer determines an image sensor position difference based on the vehicle orientation and the image sensor relative position. For example, the image sensor position difference indicates a position of the image sensor relative to the GPS receiver in an earth centered earth fixed (ECEF) frame of reference. To illustrate, the image sensor position difference indicates that the image sensor is higher than the GPS receiver in a case where the vehicle orientation (e.g., a pitch attitude) indicates that the vehicle is ascending and the image sensor relative position indicates that the image sensor is located forward along (e.g., on a nose of) the vehicle compared to the GPS receiver.

The analyzer determines a position of the landmark relative to the GPS receiver based on a difference between the map position of the landmark and the GPS position of the GPS receiver. The analyzer determines the second estimate of the position of the landmark relative to the image sensor based on the position of the image sensor relative to the GPS receiver (e.g., indicated by the image sensor position difference) and the position of the landmark relative to the GPS receiver. The second estimate indicates a predicted position of the landmark relative to the image sensor that is based on the GPS position of the GPS receiver as indicated by the position information, the map position of the landmark as indicated by the map data, and the position of the image sensor relative to the GPS receiver as indicated by the IMU measurements and the configuration data.

The analyzer determines a position offset based on a comparison of (e.g., a difference between) the first estimate and the second estimate. In a particular example, the difference between the first estimate (e.g., the detected position of the landmark) and the second estimate (e.g., the predicted position of the landmark) corresponds to an error term (or a bias term). In some examples, the GPS position of the GPS receiver is distinct from an actual position of the GPS receiver due to errors related to unsynchronized operation of GPS satellites and user clocks, errors in received GPS signals, errors related to atmospheric propagation delays, or a combination thereof. The analyzer determines an adjusted position of the GPS receiver by applying the position offset to the GPS position of the GPS receiver. The analyzer generates an output indicating the adjusted position. The analyzer reduces (e.g., removes) errors in the GPS position of the GPS receiver. For example, the adjusted position is more accurate (as compared to the GPS position) relative to positions of the landmarks. In some examples, the adjusted position is a closer approximation (as compared to the GPS position) of the actual position of the GPS receiver.

FIG. 1 is a block diagram of a system 100 that is operable to perform position information adjustment. The system 100 includes a vehicle 102. The vehicle 102 includes, without limitation, an aircraft, a car, a truck, a boat, a train, or another type of vehicle. In a particular aspect, the vehicle 102 includes an unmanned vehicle or a manned vehicle. It should be noted that in the following description, various functions performed by the system 100 of FIG. 1 are described as being performed by certain components or modules. However, this division of components and modules is for illustration only. In an alternate aspect, a function described herein as performed by a particular component or module is divided amongst multiple components or modules. Moreover, in an alternate aspect, two or more components or modules of FIG. 1 are integrated into a single component or module. In a particular aspect, one or more functions described herein as performed by the vehicle 102 are divided amongst multiple devices (e.g., the vehicle 102, a central server, a distributed system, or any combination thereof). It should be understood that the vehicle 102 is provided as an illustrative example. In some implementations, one or more of the components described with reference to the vehicle 102 are included in another device (e.g., a mobile device, a communication device, a phone, a navigation device, or a combination thereof). Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

In the example illustrated in FIG. 1, the vehicle 102 includes an analyzer 120, a memory 132, a display interface 126, an image sensor 130, a control effector 160, an IMU 150, and a GPS receiver 140. The memory 132 includes volatile memory devices (e.g., random access memory (RAM) devices), nonvolatile memory devices (e.g., read-only memory (ROM) devices, programmable read-only memory, and flash memory), or both. In a particular aspect, the memory 132 includes one or more applications (e.g., instructions) executable by the analyzer 120 to initiate, control, or perform one or more operations described herein. In an illustrative example, a computer-readable storage device (e.g., the memory 132) includes instructions that, when executed by a processor (e.g., the analyzer 120), cause the processor to initiate, perform, or control operations described herein.

In a particular aspect, the memory 132 is configured to store an image sensor relative position 193. For example, the image sensor relative position 193 is based on user input, configuration data, default data, or a combination thereof. The image sensor relative position 193 is relative to a reference point (e.g., the GPS receiver 140) of the vehicle 102 in a vehicle frame of reference. In a particular aspect, the image sensor relative position 193 is fixed (e.g., unchanging) in cases where a position of the GPS receiver 140 is fixed on the vehicle 102 and a position of the image sensor 130 is fixed on the vehicle 102. In a particular aspect, a particular location on the vehicle 102 corresponds to a point of origin in a vehicle frame of reference and the image sensor relative position 193 indicates a difference between the position of the GPS receiver 140 and the position of the image sensor 130 in the vehicle frame of reference. The image sensor relative position 193 is independent of (e.g., remains unchanged) whether the vehicle 102 is level, ascending, descending, or turning.

In a particular aspect, the analyzer 120 (e.g., the processor) is integrated into a line-replaceable unit (LRU) of the vehicle 102 (e.g., an aircraft). A LRU is a modular component of the vehicle 102 that is designed for quick replacement at an operating location. For example, a first LRU can be replaced with a second LRU in a relatively short time by opening and closing fasteners and connectors. LRUs are designed to specifications to assure interchangeability.

The display interface 126 is configured to be communicatively coupled to a display 110. In a particular aspect, the display 110 is external to the vehicle 102. For example, the vehicle 102 includes an unmanned vehicle and the display 110 is located at a ground control location. In an alternate aspect, the display 110 is internal to the vehicle 102. The GPS receiver 140 is configured to receive GPS signals 143 from a GPS system 142. The GPS receiver 140 is configured to generate position information 141 based on the GPS signals 143. The position information 141 indicates a GPS position (e.g., GPS coordinates or other coordinates) of the GPS receiver 140. It should be noted that the GPS system 142 is provided as an example of a positioning system. In some implementations, the position information 141 is based on data received from a global navigation satellite system (GNSS), a regional navigation satellite system, a satellite navigation system, a site-wide system, a workspace system, another system, user input, or a combination thereof.

The image sensor 130 is configured to generate image data 131. For example, the image data 131 indicates an image capture of a view external to the vehicle 102. The image sensor 130 includes, without limitation, an electro-optical sensor, an infra-red sensor, a light detection and ranging (LIDAR) sensor, a camera, or any combination thereof. The IMU 150 is configured to generate IMU measurements 151. In a particular aspect, the IMU measurements 151 include a motion measurement and an inertial body attitude measurement. The motion measurement includes a velocity measurement, an acceleration measurement, or both. The inertial body attitude measurement includes a heading, a pitch attitude measurement, a roll attitude measurement, or a combination thereof.

The analyzer 120 is configured to determine a vehicle orientation 191 of the vehicle 102 based on the IMU measurements 151. For example, the IMU 150 includes an accelerometer, a gyroscope, a magnetometer, or a combination thereof. In a particular aspect, the IMU measurements 151 include a first measurement from a magnetometer, a second measurement from an accelerometer, a third measurement from a gyroscope, or a combination thereof. The analyzer 120 determines a heading, a pitch attitude, a roll attitude, or a combination thereof, based on the first measurement, the second measurement, the third measurement, or a combination thereof. In a particular aspect, the IMU measurements 151 indicate the heading, the pitch attitude, the roll attitude, or a combination thereof. The vehicle orientation 191 includes the heading, the pitch attitude, the roll attitude, or a combination thereof.

The analyzer 120 is configured to determine, based at least in part on the vehicle orientation 191 and the image sensor relative position 193, an image sensor position difference 195 between a position of the image sensor 130 and a position of the GPS receiver 140, as further described with reference to FIG. 2. In a particular aspect, the image sensor position difference 195 corresponds to an orientation of the image sensor 130 relative to the reference point (e.g., the position of the GPS receiver 140) in an ECEF frame of reference. The analyzer 120 is configured to determine an estimate of a position of a landmark relative to the image sensor 130 based at least in part on the image sensor position difference 195, as further described with reference to FIG. 2. The analyzer 120 is configured to determine an adjusted position 125 of the GPS receiver 140 based at least in part on the estimate of the position of the landmark relative to the image sensor 130, as described herein. The analyzer 120 is configured to generate a control command 161 based on the adjusted position 125 and a route 127.

The control effector 160 is configured to control movement of the vehicle 102. For example, the control effector 160 is configured to generate forces and moments to change a position of the vehicle 102. To illustrate, the control effector 160 is configured to change the position of the vehicle 102 in response to receiving the control command 161 from the analyzer 120, as described herein. The control effector 160 includes, for example, a rudder, a flap, spoiler, a slat, a stabilizer, an elevator, a nose steering wheel, a brake system, an engine, or any combination thereof.

The memory 132 is configured to store map data 111 indicating position information of a plurality of landmarks. For example, the map data 111 indicates a first position (e.g., first coordinates), a second position (e.g., second coordinates), and a third position (e.g., third coordinates) of a landmark 180, a landmark 182, and a landmark 184, respectively. In a particular aspect, the map data 111 indicates position information in terms of latitude, longitude, altitude, GPS coordinates, world geodetic system 1984 (WGS84) coordinates, coordinates based on another coordinate system, or any combination thereof. For example, the first position, the second position, the third position, or a combination thereof, indicate latitude, longitude, altitude, GPS coordinates, world geodetic system 1984 (WGS84) coordinates, coordinates based on another coordinate system, or any combination thereof. In some aspects, the map data 111 indicates estimated positions of the plurality of landmarks. It should be understood that position information of three landmarks indicated by the map data 111 is provided as an illustrative example. In some implementations, the map data 111 indicates position information of fewer than three landmarks or more than three landmarks. In a particular aspect, a landmark corresponds to any identifiable feature. For example, a marker, a building, a water feature, an outcropping, a mountain, a hill, a tree, a heat signature, a sound signature, an electro-optical signature, an infra-red signature, a LIDAR signature, a manmade feature, a natural feature, or any combination thereof. In a particular implementation, the map data 111 is pre-installed (e.g., factory installed) on the GPS receiver 140. In a particular implementation, the GPS receiver 140 receives update data from the GPS system 142 and updates the map data 111 based on the update data.

During operation, the analyzer 120 receives the position information 141 from the GPS receiver 140. For example, the vehicle 102 (e.g., an aircraft) receives instructions from a user, ground control, another device, or a combination thereof. The instructions indicate that the vehicle 102 is to follow the route 127 (e.g., a mission route). The analyzer 120, in response to receiving the instructions, requests a current position from the GPS receiver 140 and receives the position information 141 from the GPS receiver 140. The position information 141 indicates a position 121 (e.g., a detected position or an estimated position) of a reference point (e.g., the GPS receiver 140) of the vehicle 102. In some examples, the position 121 (e.g., the detected position) of the reference point (e.g., the GPS receiver 140) differs from an actual position of the reference point due to estimation errors, transmission errors, or a combination thereof. For example, the position 121 is distinct from an actual position of the GPS receiver 140 due to errors related to unsynchronized operation of GPS satellites and user clocks, errors in received GPS signals, errors related to atmospheric propagation delays, or a combination thereof.

In a particular aspect, the position information 141 includes latitude, longitude, altitude, GPS coordinates, world geodetic system 1984 (WGS84) coordinates, or any combination thereof. In a particular aspect, the GPS receiver 140 can be considered a component of the GPS system 142 and the analyzer 120 receives the position information 141 from the GPS system 142. It should be understood that the GPS system 142 is provided as an illustrative example. In some aspects, the analyzer 120 receives the position information 141 from a GNSS, a regional navigation satellite system, a satellite navigation system, a site-wide system, a workspace system, another positioning system, user input, or a combination thereof.

The analyzer 120, in response to receiving the instructions, requests current IMU measurements from the IMU 150 and receives the IMU measurements 151 from the IMU 150. In a particular implementation, the analyzer 120 receives the IMU measurements 151 independently of requesting current IMU measurements. For example, the IMU 150 sends the IMU measurements 151 to the analyzer 120 at particular time intervals, in response to detecting an event (such as a change in the IMU measurements 151), or a combination thereof. In a particular example, the IMU measurements 151 include a first measurement from a magnetometer, a second measurement from an accelerometer, a third measurement from a gyroscope, or any combination thereof. In a particular example, the IMU measurements 151 indicate a heading, a pitch attitude, a roll attitude, or a combination thereof of the vehicle 102.

The analyzer 120, in response to receiving the instructions, requests current image data from the image sensor 130 and receives the image data 131 from the image sensor 130. In a particular implementation, the analyzer 120 receives the image data 131 independently of requesting current image data. For example, the IMU 150 sends the image data 131 to the analyzer 120 at particular time intervals, in response to detecting an event (such as a change in the IMU measurements 151, the image data 131, or both), or a combination thereof.

In a particular aspect, the image data 131, the IMU measurements 151, the position information 141, or a combination thereof, are related to each other. For example, the image data 131 has a first timestamp, the IMU measurements 151 have a second timestamp, and the position information 141 has a third timestamp, or a combination thereof. The analyzer 120 identifies related data in response to receiving the instructions. The analyzer 120 determines that data having timestamps within a threshold time period are related. For example, the analyzer 120 determines that the image data 131 is related to the position information 141 in response to determining that a difference between the first timestamp and the third timestamp satisfies (e.g., is less than) a timestamp threshold. As another example, the analyzer 120 determines that the IMU measurements 151 are related to the position information 141 in response to determining that a difference between the second timestamp and the third timestamp satisfies (e.g., is less than) the timestamp threshold. The analyzer 120 analyzes the related data, as described herein.

The analyzer 120 determines that the image data 131 corresponds to an image of one or more landmarks captured by the image sensor 130. For example, the analyzer 120 determines that the image data 131 indicates the landmark 180, as further described with reference to FIG. 4. The analyzer 120 determines, based on the image data 131 and the map data 111, first estimates (e.g., image-based estimates) of positions of the one or more landmarks relative to the image sensor 130. For example, the analyzer 120 determines a first estimate 113 (e.g., an image-based estimate) of a position, relative to the image sensor 130, of the landmark 180, as further described with reference to FIG. 4. To illustrate, the analyzer 120 uses various image subject distance determination techniques to determine the first estimate 113. The first estimate 113 (e.g., an image-based estimate) corresponds to a detected difference between a position of the image sensor 130 and the position of the landmark 180.

The analyzer 120 determines the vehicle orientation 191 based on the IMU measurements 151, as further described with reference to FIG. 4. For example, the vehicle orientation 191 indicates a heading, a pitch attitude, a roll attitude, or a combination thereof. The analyzer 120 determines, based on the image data 131 and the map data 111, second estimates (e.g., map-based estimates) of positions of the one or more landmarks relative to the image sensor 130. For example, the analyzer 120 determines, based on the position information 141, the image sensor position difference 195, the vehicle orientation 191, the image sensor relative position 193, the map data 111, or a combination thereof, a second estimate 115 (e.g., a map-based estimate) of the position of the landmark 180 relative to the image sensor 130, as further described with reference to FIG. 4. The second estimate 115 (e.g., a map-based estimate) corresponds to a predicted difference (e.g., a latitude difference, a longitude difference, an altitude difference, or a combination thereof) between a position of the image sensor 130 and the position of the landmark 180.

The analyzer 120 determines position offset data 119 based at least in part on a comparison of the first estimate 113 and the second estimate 115. For example, the analyzer 120 determines a position offset 171 based on a comparison of the first estimate 113 of a position of the landmark 180 and the second estimate 115 of a position of the landmark 180, as further described with reference to FIGS. 2 and 4. In a particular aspect, the analyzer 120 determines a plurality of position offsets 173 based on estimates of positions of a plurality of landmarks. For example, the plurality of position offsets 173 includes the position offset 171 associated with the landmark 180, a first position offset associated with the landmark 182, a second position offset associated with the landmark 184, or a combination thereof. The first position offset is based on a first estimate (e.g., an image-based estimate) of a position of the landmark 182 and a second estimate (e.g., a map-based estimate) of a position of the landmark 182. The second position offset is based on a first estimate (e.g., an image-based estimate) of a position of the landmark 184 and a second estimate (e.g., a map-based estimate) of a position of the landmark 184.

The analyzer 120 determines the adjusted position 125 based on the position offset data 119 and the position information 141, as further described with reference to FIG. 4. For example, the analyzer 120 determines a representative position offset based on the position offset data 119. In a particular aspect, the representative position offset includes the position offset 171. In another aspect, the representative position offset is based on (e.g., is an average of) the plurality of position offsets 173. The representative position offset indicates a representative bias between the detected position (e.g., image-based position) of one or more landmarks and the predicted position (e.g., map-based position) of the one or more landmarks. The analyzer 120 determines the adjusted position 125 by applying the representative position offset to the position 121. In a particular aspect, the adjusted position 125 is more accurate (as compared to the position 121) relative to the positions of the landmark 180, the landmark 182, the landmark 184, or a combination thereof, indicated in the map data 111, as further described with respect to FIGS. 2 and 7. In some examples, the adjusted position 125 of the GPS receiver 140 is a closer approximation (as compared to the position 121) of an actual position of the GPS receiver 140, as further described with reference to FIG. 2.

The analyzer 120 generates an output 123 indicating the adjusted position 125. In a particular aspect, the output 123 corresponds to a graphical user interface (GUI) indicating the adjusted position 125 on a map. In a particular aspect, the analyzer 120 generates the control command 161 based on the adjusted position 125 and the route 127, as further described with reference to FIG. 6. For example, the control command 161 indicates an operation to be performed for the vehicle 102 to follow the route 127. The analyzer 120 sends the control command 161 to the control effector 160. In a particular aspect, the analyzer 120 sends the control command 161 to a control system of the vehicle 102 (e.g., an aircraft). The control system includes the control effector 160, one or more additional control effectors, other components, or any combination thereof. The control system performs, based on the control command 161, one or more operations to change a position of the vehicle 102 (e.g., an aircraft).

The system 100 thus enables determination of the adjusted position 125 that is more accurate (as compared to the position 121) relative to positions of the landmarks 180-184 as indicated in the map data 111. In a particular aspect, the adjusted position 125 of the vehicle 102 can be used to navigate the vehicle 102 relative to the landmarks 180-184 to follow the route 127.

Figure 2:
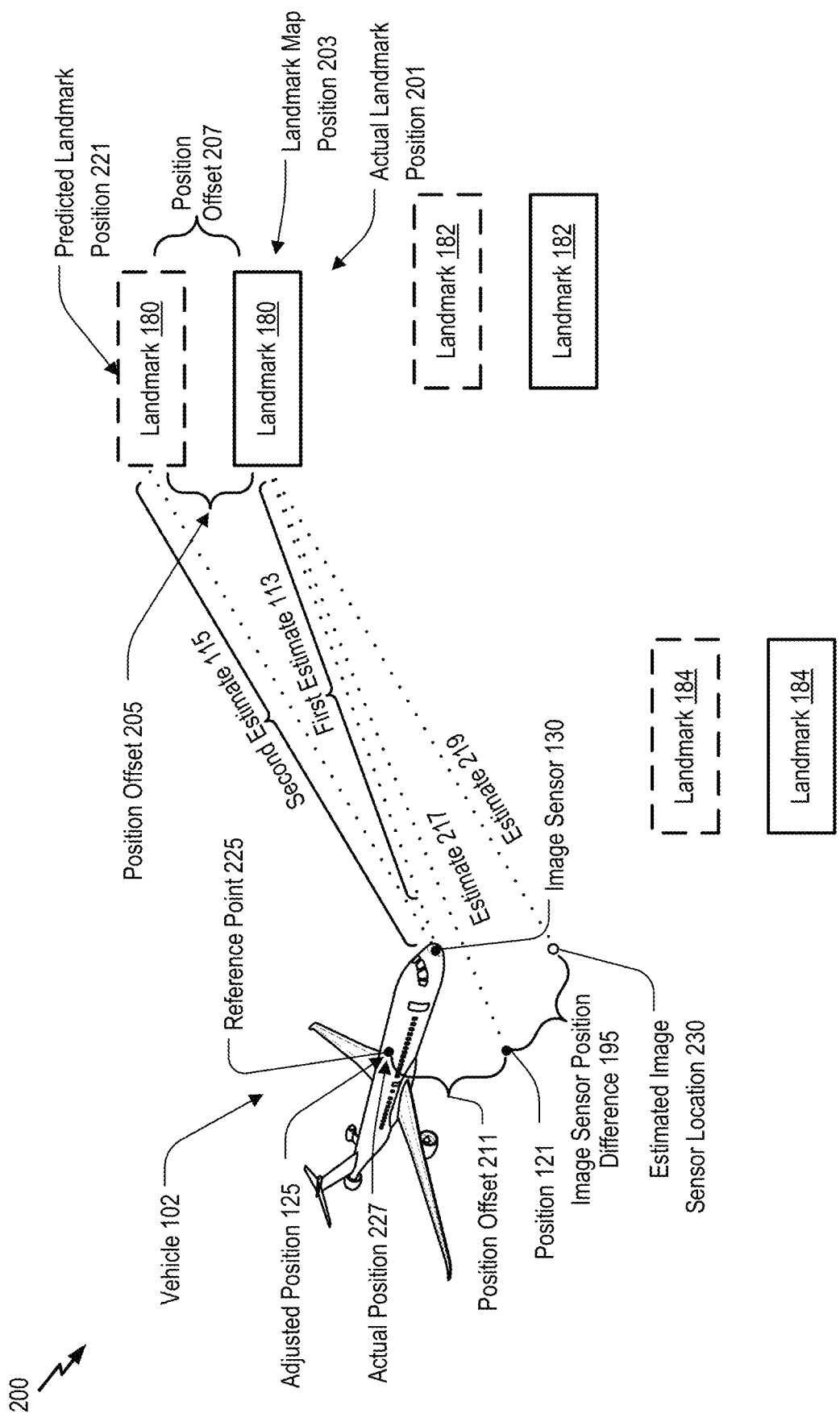
FIG. 2 is a diagram that illustrates an example of position information adjustment performed by the system of FIG. 1.

Referring to FIG. 2, an example of position information adjustment is shown and generally designated 200. In a particular aspect, the position information adjustment is performed by the analyzer 120, the system 100, or both, of FIG. 1.

The vehicle 102 includes a reference point 225. In a particular aspect, a position of the reference point 225 is considered as the position of the vehicle 102. In a particular implementation, the reference point 225 includes the GPS receiver 140 of FIG. 1. The analyzer 120 determines the position 121 based on the position information 141, as described with reference to FIG. 1. The position 121 is an estimated map-based position (e.g., GPS position) of the reference point 225. In FIG. 2, the position 121 is distinct from an actual position 227 of the reference point 225. For example, the position 121 differs from the actual position 227 due to estimation errors, transmission errors, or a combination thereof. The landmark 180 is located at an actual landmark position 201. The analyzer 120 determines the first estimate 113 (e.g., an image-based estimate) of a position of the landmark 180 relative to the image sensor 130, as described with reference to FIG. 1.

The map data 111 of FIG. 1 indicates a landmark map position 203 of the landmark 180. In the example illustrated in FIG. 2, the landmark map position 203 corresponds to the actual landmark position 201 because the map data 111 indicating the landmark map position 203 is accurate. In some aspects, the map data 111 is based on a detailed survey of an area that includes the landmark 180. In some examples, the landmark map position 203 is distinct from the actual landmark position 201 due to errors in the map data 111, as further described with reference to FIG. 7.

The analyzer 120 determines, based on the landmark map position 203, an estimate 217 of a position of the landmark 180 relative to the position 121. For example, the estimate 217 indicates a difference (e.g., longitude difference, latitude difference, altitude difference, or a combination thereof) between the landmark map position 203 and the position 121.

The analyzer 120 determines the vehicle orientation 191, as described with reference to FIG. 1. In a particular aspect, configuration data indicates the image sensor relative position 193 corresponding to a difference (e.g., a first distance along an X-axis, a first distance along a Y-axis, and a first distance along a Z-axis) between a position of the image sensor 130 and the reference point 225 in a vehicle frame of reference (e.g., a point in the vehicle 102 corresponds to an origin of the vehicle frame of reference). In a particular example, the image sensor 130 is located on a nose of the vehicle 102 a particular distance forward of the reference point 225 and at the same altitude as the reference point 225 in a vehicle frame of reference. In this example, the image sensor relative position 193 indicates that the image sensor 130 is located a first distance along the X-axis (e.g., no difference along the Y-axis and no difference along the Z-axis) from the reference point 225 in the vehicle frame of reference.

The analyzer 120 determines the image sensor position difference 195 based on the image sensor relative position 193 and the vehicle orientation 191. The image sensor position difference 195 indicates a first position of the image sensor 130 on the vehicle 102 relative to a second position of the reference point 225 on the vehicle 102 in an ECEF frame of reference. In a particular example, when the vehicle orientation 191 indicates that the vehicle 102 is level, the image sensor position difference 195 is the same as the image sensor relative position 193. When the vehicle orientation 191 indicates that the vehicle 102 is not level (e.g., the vehicle 102 is ascending, descending, turning, or a combination thereof), the analyzer 120 determines the image sensor position difference 195 (e.g., a second distance along the X-axis, a second distance along the Y-axis, and a second distance along the Z-axis) in an ECEF frame of reference based on the image sensor relative position 193 (e.g., a first distance along the X-axis, a first distance along the Y-axis, and a first distance along the Z-axis in the vehicle frame of reference) and the vehicle orientation 191 (e.g., a heading, a roll attitude, a pitch attitude, or a combination thereof). To illustrate, the analyzer 120 determines the image sensor position difference 195 by applying, based on the vehicle orientation 191, a rotation operation, a translation operation, or both, to the image sensor relative position 193.

The analyzer 120 generates an estimate 219 of the position of the landmark 180 relative to an estimated image sensor location 230 by applying the image sensor position difference 195 (e.g., an orientation of the image sensor 130 relative to the reference point 225 in an ECEF frame of reference) to the estimate 217. The estimated image sensor location 230 indicates where the image sensor 130 would be located if the reference point 225 were located at the position 121.

In a particular aspect, the analyzer 120 determines the estimated image sensor location 230 by applying the image sensor position difference 195 to the position 121. In this aspect, the analyzer 120 determines the estimate 219 based on a difference between the landmark map position 203 and the estimated image sensor location 230.

The second estimate 115 is equal to the estimate 219. The second estimate 115 (e.g., a map-based estimate) indicates a predicted landmark position 221 that the landmark 180 would have had relative to the image sensor 130 if the position 121 indicated the actual position 227 of the reference point 225. The analyzer 120 determines a position offset 205 based on a comparison of (e.g., a difference between) the first estimate 113 (e.g., the image-based estimate) and the second estimate 115 (e.g., the map-based estimate).

The analyzer 120 determines a position offset 211 based at least in part on the position offset 205, as further described with reference to FIG. 4. For example, the position offset 205 indicates a difference (e.g., −10 degrees and a first distance—a second distance) between the image-based estimate (e.g., 20 degrees and the first distance from the image sensor 130) of a position of the landmark 180 relative to the image sensor 130 and the map-based estimate (e.g., 30 degrees and the second distance from the image sensor 130) of a position of the landmark 180 relative to the image sensor 130. The analyzer 120 determines a position offset 207 by performing a coordinate transformation on the position offset 205. The position offset 207 indicates a difference (e.g., 90 degrees and a third distance) between the predicted landmark position 221 and the landmark map position 203. The analyzer 120 determines the position offset 211 based on a consolidation (e.g., an average) of the position offset 207, a first position offset of the landmark 182, a second position offset of the landmark 184, or a combination thereof.

The analyzer 120 determines the adjusted position 125 by applying the position offset 211 to the position 121. As illustrated in FIG. 2, where the landmark map position 203 is proximate to the actual landmark position 201, the adjusted position 125 is closer, as compared with the position 121, to the actual position 227 of the reference point 225. The analyzer 120 of FIG. 1 thus reduces (e.g., removes) errors in the position 121 (e.g., the GPS position) of the vehicle 102. The adjusted position 125 is also more accurate (as compared to the position 121) relative to the actual landmark position 201. In a particular aspect, the position offset 205 corresponds to an estimated position offset, the position offset 207 corresponds to a landmark position offset, the position offset 211 corresponds to a vehicle position offset, or a combination thereof.

Figure 3:
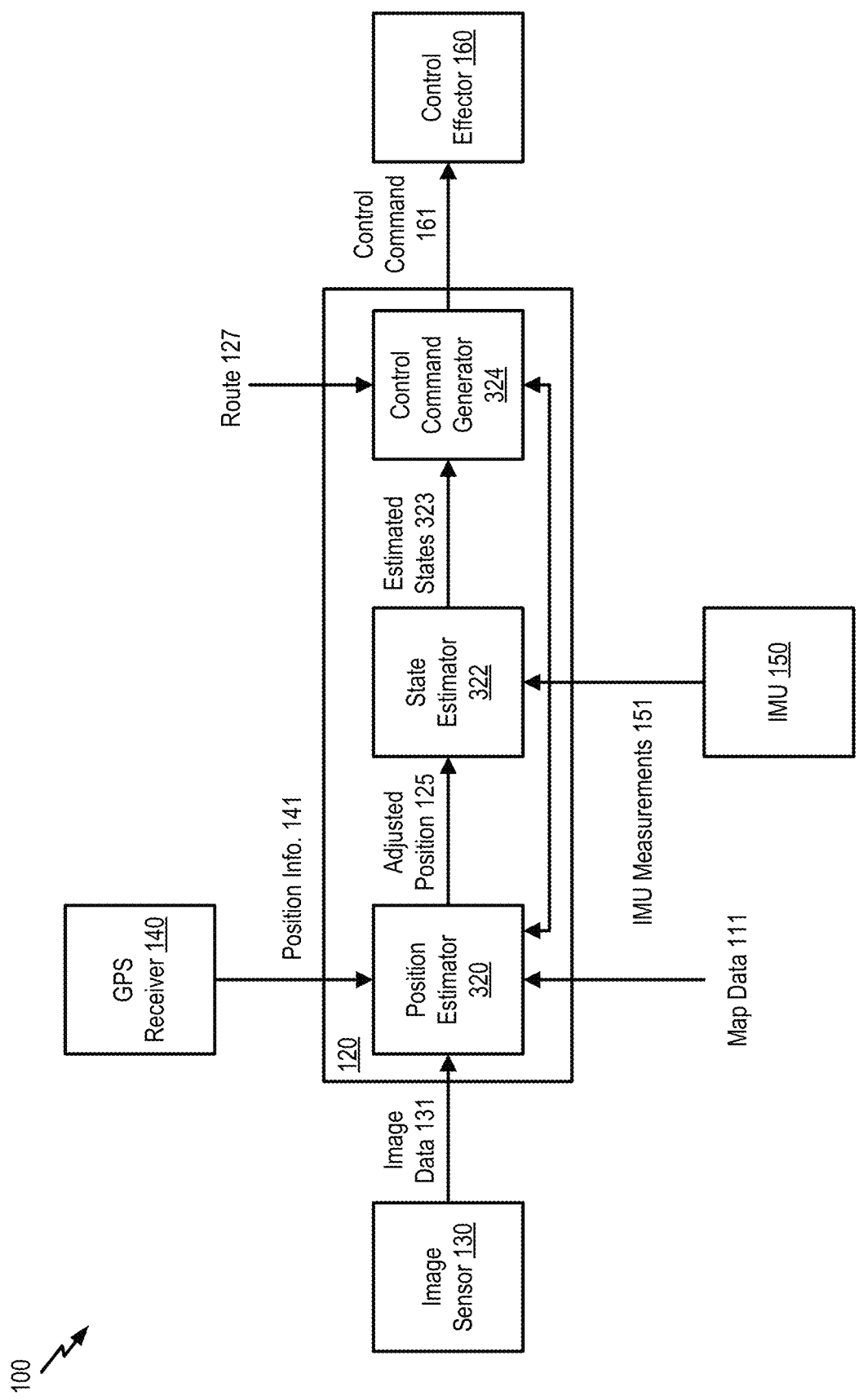
FIG. 3 is a diagram that illustrates an example of an analyzer of the system of FIG. 1.

Referring to FIG. 3, examples of components of the system 100 are shown. In FIG. 3, the analyzer 120 includes a position estimator 320, a state estimator 322, and a control command generator 324. The control command generator 324 is coupled to the control effector 160. The position estimator 320 receives the position information 141 from the GPS receiver 140, the image data 131 from the image sensor 130, the IMU measurements 151 from the IMU 150, or a combination thereof. The position estimator 320 determines the adjusted position 125 based on the position information 141, the image data 131, the IMU measurements 151, and the map data 111, as further described with reference to FIG. 4. The position estimator 320 provides the adjusted position 125 to the state estimator 322.

The state estimator 322 determines estimated states 323 of the vehicle 102 based on the adjusted position 125, the IMU measurements 151, or both, as further described with reference to FIG. 5. The state estimator 322 provides the estimated states 323 to the control command generator 324. The control command generator 324 generates the control command 161 based on the estimated states 323, the route 127, the IMU measurements 151, or a combination thereof, as further described with reference to FIG. 6. The control command generator 324 sends the control command 161 to the control effector 160. In a particular aspect, the control effector 160 causes or controls movement of the vehicle 102 to change a position of the vehicle 102 based on the control command 161. The analyzer 120 is thus configured to enable navigation of the vehicle 102 based on the adjusted position 125 and the route 127.

Figure 4:
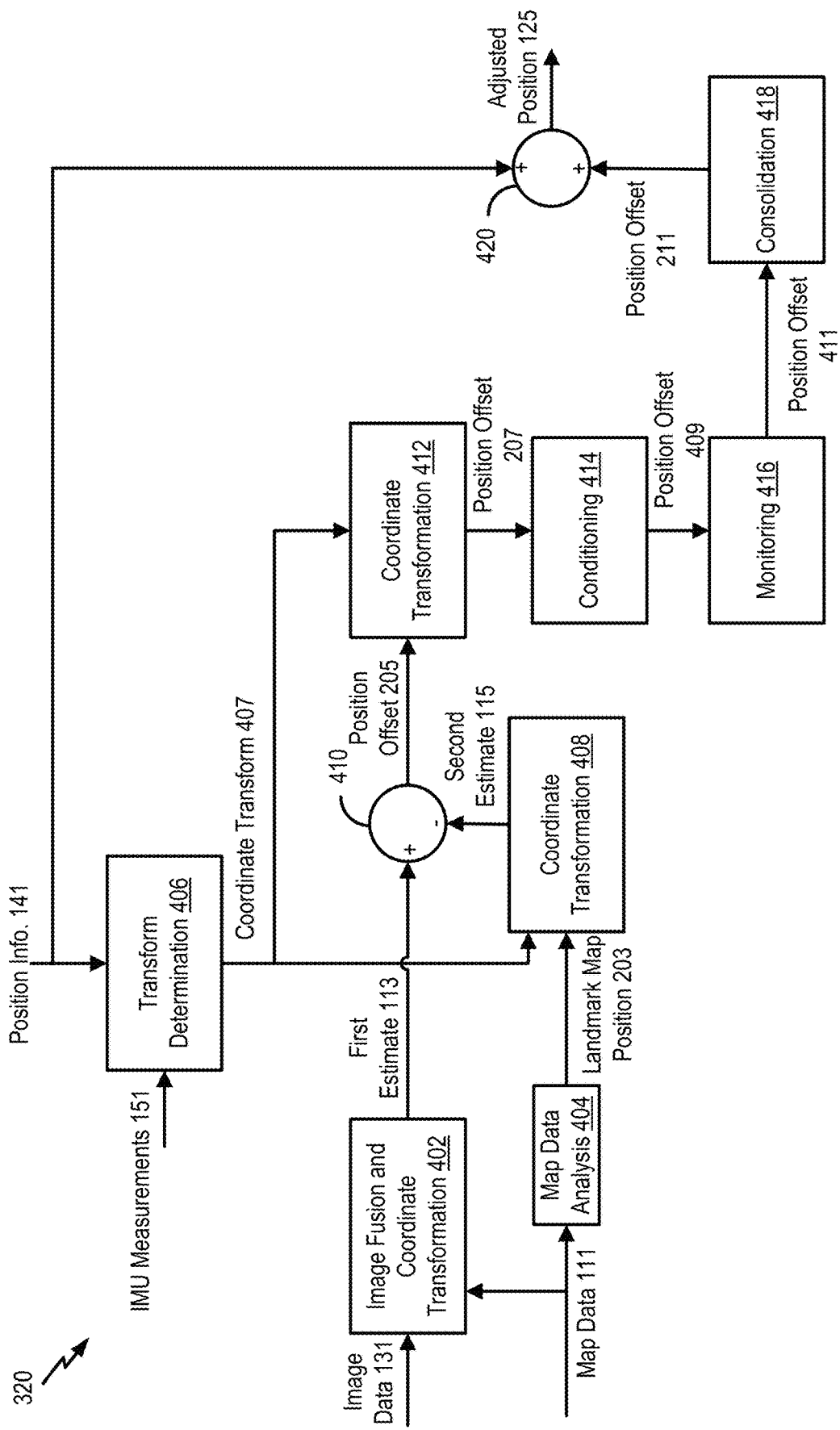
FIG. 4 is a diagram that illustrates an example of a position estimator of the analyzer of the system of FIG. 3.

Referring to FIG. 4, an example of operation of the position estimator 320 is shown. The position estimator 320 generates the first estimate 113 by performing image fusion and coordinate transformation, at 402. In a particular example, the position estimator 320 identifies one or more landmarks indicated in the image data 131. In a particular aspect, the position estimator 320 determines a search area that is within a threshold search distance of the position 121. The map data 111 includes images of landmarks located (or estimated to be located) within the search area. The position estimator 320 performs an image search by comparing the image data 131 to the images of landmarks. The position estimator 320 can use various image analysis techniques to perform the image search. The position estimator 320 determines, based on the image search, that the image data 131 indicates the landmark 180, the landmark 182, the landmark 184, or a combination thereof.

The position estimator 320 determines, based on the image data 131 and the map data 111, first estimates (e.g., image-based estimates) of positions of the one or more landmarks relative to the image sensor 130. For example, the position estimator 320 determines the first estimate 113 (e.g., an image-based estimate) of a position, relative to the image sensor 130, of the landmark 180. The position estimator 320 uses various image subject distance determination techniques to determine the first estimate 113. For example, the position estimator 320 estimates, based on first image data, a first bearing of the landmark 180 from the image sensor 130. The position estimator 320 estimates, based on the image data 131, a second bearing of the landmark 180 from the image sensor 130. The position estimator 320 determines a relative difference between a position of the image sensor 130 at a first time at which the first image data is captured and a position of the image sensor 130 at a second time at which the image data 131 is captured. The position estimator 320 determines the first estimate 113 by performing triangulation or trilateration based on the first bearing, the second bearing, and the relative difference between the positions of the image sensor 130. In a particular aspect, the first estimate 113 represents a position of the landmark 180 in a visual frame of reference that is relative to the image sensor 130.

The position estimator 320 determines the landmark map position 203 of the landmark 180 by performing map data analysis, at 404. For example, the position estimator 320 determines that the map data 111 indicates that the landmark 180 (e.g., identified at 402) has the landmark map position 203. In a particular aspect, the landmark map position 203 represents a position of the landmark 180 in an ECEF frame of reference.

The position estimator 320 performs a transform determination, at 406. For example, the position estimator 320 determines the vehicle orientation 191 based on the IMU measurements 151. To illustrate, the IMU measurements 151 indicate a heading, a pitch attitude, a roll attitude, or a combination thereof, of the vehicle 102. The vehicle orientation 191 includes the heading, the pitch attitude, the roll attitude, or a combination thereof.

In a particular aspect, the memory 132 indicates the image sensor relative position 193 of the image sensor 130. In a particular implementation, the image sensor relative position 193 is fixed (e.g., unchanging), as described with reference to FIG. 1. In a particular implementation, the image sensor 130 is movable and the vehicle 102 updates the image sensor relative position 193 based on a change in position of the image sensor 130.

The position estimator 320 determines a coordinate transform 407 based on the position 121, the image sensor relative position 193, and the vehicle orientation 191. For example, the position estimator 320 determines an estimated position of the image sensor 130 (e.g., the estimated image sensor location 230 of FIG. 2) based on the position 121, the image sensor relative position 193, and the vehicle orientation 191. To illustrate, the position estimator 320 determines the image sensor position difference 195 based on the image sensor relative position 193 and the vehicle orientation 191, as described with reference to FIG. 1. The position estimator 320 determines the estimated image sensor location 230 by applying the image sensor position difference 195 (e.g., an orientation of the image sensor 130 relative to the reference point 225 in an ECEF frame of reference) to the position 121. In a particular aspect, the coordinate transform 407 indicates a rotational operation, a translational operation, or both, that corresponds to the image sensor position difference 195. For example, applying the coordinate transform 407 to the position 121 generates the estimated image sensor location 230.

The position estimator 320 determines the second estimate 115 (e.g., a map-based estimate) of a predicted position of the landmark 180 by performing a coordinate transformation, at 408. For example, the position estimator 320 determines the second estimate 115 by applying the coordinate transform 407 to the landmark map position 203, as described with reference to FIG. 2. In a particular aspect, the second estimate 115 represents a predicted position of the landmark 180 in a visual frame of reference that is relative to the image sensor 130.

The position estimator 320 determines the position offset 205 based on a comparison of the first estimate 113 and the second estimate 115, at 410. For example, the position offset 205 indicates a difference between the image-based estimate (e.g., the first estimate 113) of a detected position of the landmark 180 relative to the image sensor 130 of FIG. 1 and the map-based estimate (e.g., the second estimate 115) of a predicted position of the landmark 180 relative to the image sensor 130, as described with reference to FIG. 2. In a particular aspect, the position offset 205 represents a difference between the image-based estimate of a position of the landmark 180 and a map-based estimate of a position of the landmark 180 in a visual frame of reference that is relative to the image sensor 130.

The position estimator 320 determines the position offset 207 by performing a coordinate transformation, at 412. For example, the position estimator 320 determines the position offset 207 by applying the coordinate transform 407 to the position offset 205, as described with reference to FIG. 2. The position offset 207 indicates an estimated difference between the predicted position of the landmark 180 and the landmark map position 203, as described with reference to FIG. 2. In a particular aspect, the position offset 207 represents a difference between the image-based estimate of a position of the landmark 180 and a map-based estimate of a position of the landmark 180 in an ECEF frame of reference.

The position estimator 320 generates a position offset 409 by performing conditioning, at 414. For example, the position estimator 320 filters position offsets to reduce noise. To illustrate, the position estimator 320 generates the position offset 409 by applying a noise filter to the position offset 207. The filter generates the position offset 409 by updating the position offset 207 in response to determining that the position offset 207 fails to satisfy a change criterion. For example, the position estimator 320 determines that the position offset 207 fails to satisfy the change criterion in response to determining that a change between the position offset 207 and a previous position offset is greater than a change threshold.

In a particular aspect, the position estimator 320, in response to determining that the position offset 207 fails to satisfy the change criterion, generates the position offset 409 based on the previous position offset and the change threshold. For example, the position estimator 320, in response to determining that a difference between the position offset 207 and the previous position offset exceeds the change threshold (e.g., a maximum allowable change), generates the position offset 409 to equal a sum of the previous position offset and the change threshold. In this example, the position offset 409 represents a maximum allowable change to the previous position offset. Alternatively, the position estimator 320, in response to determining that the position offset 207 satisfies the change criterion, outputs the position offset 207 as the position offset 409. In a particular aspect, the position offset 409 represents a filtered position offset of the landmark 180 in an ECEF frame of reference.

The position estimator 320 generates a position offset 411 by performing monitoring, at 416. For example, the position estimator 320 determines that the position offset 409 satisfies a monitoring criterion in response to determining that the position offset 411 satisfies (e.g., is less than) a monitoring threshold. The position estimator 320, in response to determining that the position offset 409 satisfies the monitoring criterion, selects the position offset 409 as the position offset 411. Alternatively, the position estimator 320, in response to determining that the position offset 409 fails to satisfy the monitoring criterion, selects a default value (e.g., 0) as the position offset 411 to bypass adjustment of the position 121. In a particular aspect, failure of the position offset 411 to satisfy the monitoring criterion indicates an error in the image data 131, a malfunction in the image sensor 130, an error in the IMU measurements 151, a malfunction in the IMU 150, or a combination thereof. In a particular aspect, the position offset 411 represents a selected position offset of the landmark 180 in an ECEF frame of reference.

The position estimator 320 generates the position offset 211 by performing consolidation, at 418. For example, the position estimator 320 determines the position offset 211 based on the position offset 411 of the landmark 180, a second position offset of the landmark 182, a third position offset of the landmark 184, or a combination thereof. In a particular aspect, the second position offset of the landmark 182 includes a second conditioned position offset based on a comparison of (e.g., a difference between) a map-based estimate of a position of the landmark 182 relative to the image sensor 130 and an image-based estimate of a position of the landmark 182 relative to the image sensor 130. In a particular aspect, the third position offset of the landmark 184 includes a third conditioned position offset based on a comparison of (e.g., a difference between) a map-based estimate of a position of the landmark 184 relative to the image sensor 130 and an image-based estimate of a position of the landmark 184 relative to the image sensor 130. In a particular aspect, the position offset 211 corresponds to an average position offset (e.g., a mean value, a median value, or a mode value) of the position offset 411, the second position offset, the third position offset, or a combination thereof. For example, the position offset 211 based on a plurality of conditioned position offsets, such as the position offset 411, the second conditioned position offset, the third conditioned position offset, or a combination thereof.

In a particular aspect, the position estimator 320 generates the position offset 211 independently of the position offset 411 in response to determining that the position offset 411 indicates the default value (e.g., 0) that bypasses adjustment of the position 121. In a particular aspect, the position estimator 320 generates the position offset 211 indicating the default value (e.g., 0) in response to determining that the position offset 411, the second position offset, the third position offset, or a combination thereof, indicate the default value (e.g., 0). In a particular aspect, the position offset 211 represents a consolidated position offset of the landmark 180 in an ECEF frame of reference.

The position estimator 320 determines the adjusted position 125 based on the position 121 and the position offset 211, at 420. For example, the position estimator 320 determines the adjusted position 125 by applying the position offset 211 to the position 121. In a particular aspect, the position estimator 320, in response to determining that the position offset 211 indicates the default value (e.g., 0) to bypass adjustment of the position 121, generates the adjusted position 125 to indicate (e.g., equal) the position 121. In a particular aspect, the position offset 171 corresponds to the position offset 205, the position offset 207, the position offset 409, the position offset 411, or the position offset 211. In a particular aspect, the position offset 409 corresponds to a conditioned position offset, the position offset 411 corresponds to a monitored position offset, or both.

The position estimator 320 thus generates the adjusted position 125 based on a comparison of the image-based estimate of a position of the landmark 180 relative to the image sensor 130 and the map-based estimate of a position of the landmark 180 relative to the image sensor 130. In some aspects, the adjusted position 125 is closer, as compared to the position 121, to the actual position of the reference point 225, as described with reference to FIG. 2. In some aspects, the adjusted position 125 is more accurate relative to the landmark 180, the landmark 182, the landmark 184, or a combination thereof, as further described with reference to FIG. 7. In some aspects, the position estimator 320 bypasses the position adjustment in response to detecting that a monitoring criterion is not satisfied. In these aspects, the adjusted position 125 is the same as the position 121.

Figure 5:
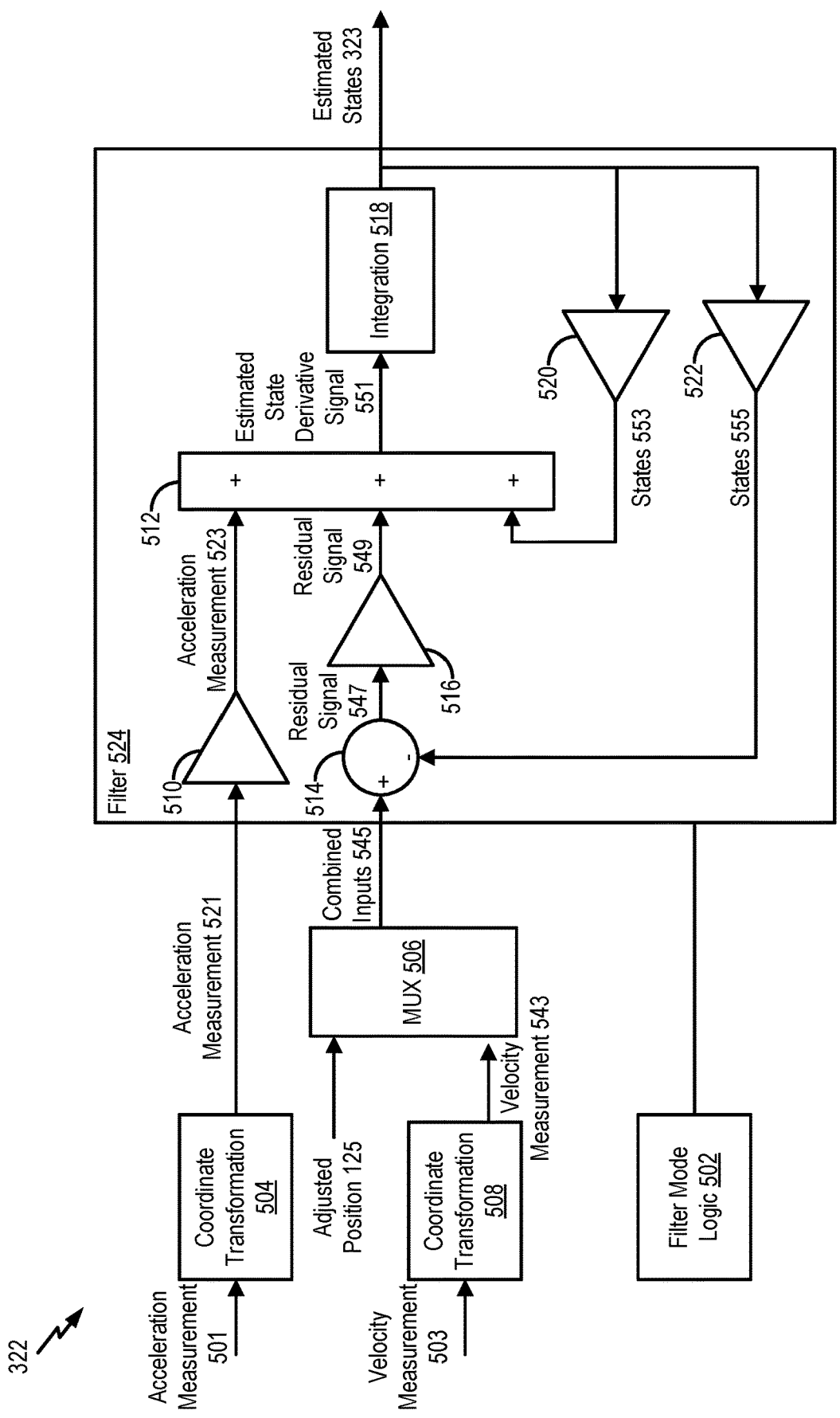
FIG. 5 is a diagram that illustrates an example of a state estimator of the analyzer of FIG. 3.

Referring to FIG. 5, an example of operation of the state estimator 322 is shown. The state estimator 322 includes a filter 524 coupled to filter mode logic 502 and to a multiplexor (MUX) 506. The filter mode logic 502 is configured to control operation of the filter 524. For example, the filter mode logic 502 can update a configuration of the filter 524 to account for failures, dropped image frames, other nonlinear behavior, or a combination thereof. The filter 524 includes a matrix 510, a matrix 516, a matrix 520, a matrix 522, or a combination thereof. It should be understood that the matrix 510, the matrix 516, the matrix 520, and the matrix 522 are provided as illustrative examples. In some implementations, the filter 524 includes other types of filter elements, such as a digital filter (e.g., a linear digital filter).

The state estimator 322 generates an acceleration measurement 521 by performing a coordinate transformation, at 504. For example, the state estimator 322 receives an acceleration measurement 501 of the IMU measurements 151 from the IMU 150. The acceleration measurement 501 corresponds to a local level frame of reference. The state estimator 322 generates the acceleration measurement 521 by performing a coordinate transformation on the acceleration measurement 501 from the local level frame of reference to an ECEF frame of reference.

The state estimator 322 generates a velocity measurement 543 by performing a coordinate transformation, at 508. For example, the state estimator 322 receives a velocity measurement 503 of the IMU measurements 151 from the IMU 150. The velocity measurement 503 corresponds to a local level frame of reference. The state estimator 322 generates the velocity measurement 543 by performing a coordinate transformation on the velocity measurement 503 from the local level frame of reference to an earth centered earth fixed (ECEF) frame of reference.

The MUX 506 generates combined inputs 545 by combining the adjusted position 125 and the velocity measurement 543. For example, the combined inputs 545 corresponds to a vector that indicates the adjusted position 125 and the velocity measurement 543.

The filter 524 generates an acceleration measurement 523 by applying the matrix 510 to the acceleration measurement 521. Applying the matrix 510 generates the acceleration measurement 523 (e.g., a second acceleration vector) based on the acceleration measurement 521 (e.g., a first acceleration vector). For example, the acceleration measurement 521 corresponds to a first acceleration vector. Applying the matrix 510 to the first acceleration vector generates a second acceleration vector corresponding to the acceleration measurement 523. In a particular aspect, the second acceleration vector (e.g., an estimator state vector) includes a different count of values than the first acceleration vector. Applying the matrix 510 generates a second count of values (e.g., more than 3 values) of the second acceleration vector based on a first count of values (e.g., 3 values) of the first acceleration vector. The filter 524 generates a residual signal 547 based on a comparison of (e.g., a difference between) the combined inputs 545 and states 555 previously generated by applying the matrix 522. In a particular aspect, the residual signal 547 indicates an adjusted position difference, a velocity measurement difference, or both. The adjusted position difference is based on a comparison of the adjusted position 125 and a first adjusted position indicated by the states 555. The velocity measurement difference is based on a comparison of the velocity measurement 543 and a first velocity measurement indicated by the states 555.

The filter 524 generates a residual signal 549 by applying the matrix 516 to the residual signal 547. Applying the matrix 516 generates the residual signal 549 by applying gains to attenuate noise of the residual signal 547, applying gains to frequency weight inputs of the residual signal 547, or a combination thereof. In a particular aspect, the filter 524 generates a gain-adjusted position difference by applying a first gain to the adjusted position difference, a gain-adjusted velocity measurement difference by applying a second gain to velocity measurement difference, or both. In this aspect, the residual signal 549 indicates the gain-adjusted position difference, the gain-adjusted velocity measurement difference, or both.

The filter 524 generates an estimated state derivative signal 551 by providing the acceleration measurement 523, the residual signal 549, states 553 previously generated by applying the matrix 520, or a combination thereof, to a sum block 512. The estimated state derivative signal 551 corresponds to an estimated state derivative. Providing the acceleration measurement 521 to the filter 524 corresponds to a feed forward mechanism. Generating the estimated state derivative signal 551 based on the states 553 and the states 555 corresponds to a feedback mechanism. The filter 524 generates the estimated state derivative signal 551 to reduce the residual signal 547 during a subsequent iteration. For example, the sum block 512 generates the estimated state derivative signal 551 based on the acceleration measurement 523, the residual signal 549, the states 553, or a combination thereof. To illustrate, the estimated state derivative signal 551 is composed of the acceleration measurement 523, the residual signal 549, and the states 553. In a particular aspect, the acceleration measurement 523, the states 553, or a combination thereof, represent kinematics (e.g., assumed-known kinematics), such as accelerations as derivatives of velocities. In a particular aspect, the residual signal 549 corresponds to a correction term (e.g., a primary correction term). The filter 524 uses the residual signal 549 (e.g., a correction term) to reduce an error in the estimated states 323. In a particular aspect, the error in the estimated states 323 is represented by the residual signal 547 of the combined inputs 545 (e.g., actual measurements) and the states 555 (e.g., predicted measurements). In a particular aspect, the residual signal 547 (e.g., the error in the estimated states 323) is reduced (e.g., driven to zero) over subsequent iterations through application of the matrix 516 (e.g., a gain). The filter 524 generates a second adjusted position based on the acceleration measurement 523, the gain-adjusted position difference, and the states 553. The filter generates a second velocity measurement based on the acceleration measurement 523, the gain-adjusted velocity measurement difference, and the states 553. The estimated state derivative signal 551 indicates the second adjusted position, the second velocity measurement, or both.

The filter 524 generates the estimated states 323 by performing an integration operation, at 518. For example, the filter 524 performs an integration operation based on the estimated state derivative signal 551. The filter 524 generates the states 553 by applying the matrix 520 to the estimated states 323. The matrix 520 defines state dynamics. The filter 524 generates the states 555 by applying the matrix 522 to the estimated states 323. In a particular aspect, applying the matrix 522 includes selecting a subset of the estimated states 323 as the states 555. The state estimator 322 thus generates the estimated states 323 by applying the filter 524 to the acceleration measurement 501, the adjusted position 125, the velocity measurement 503, or a combination thereof.

Figure 6:
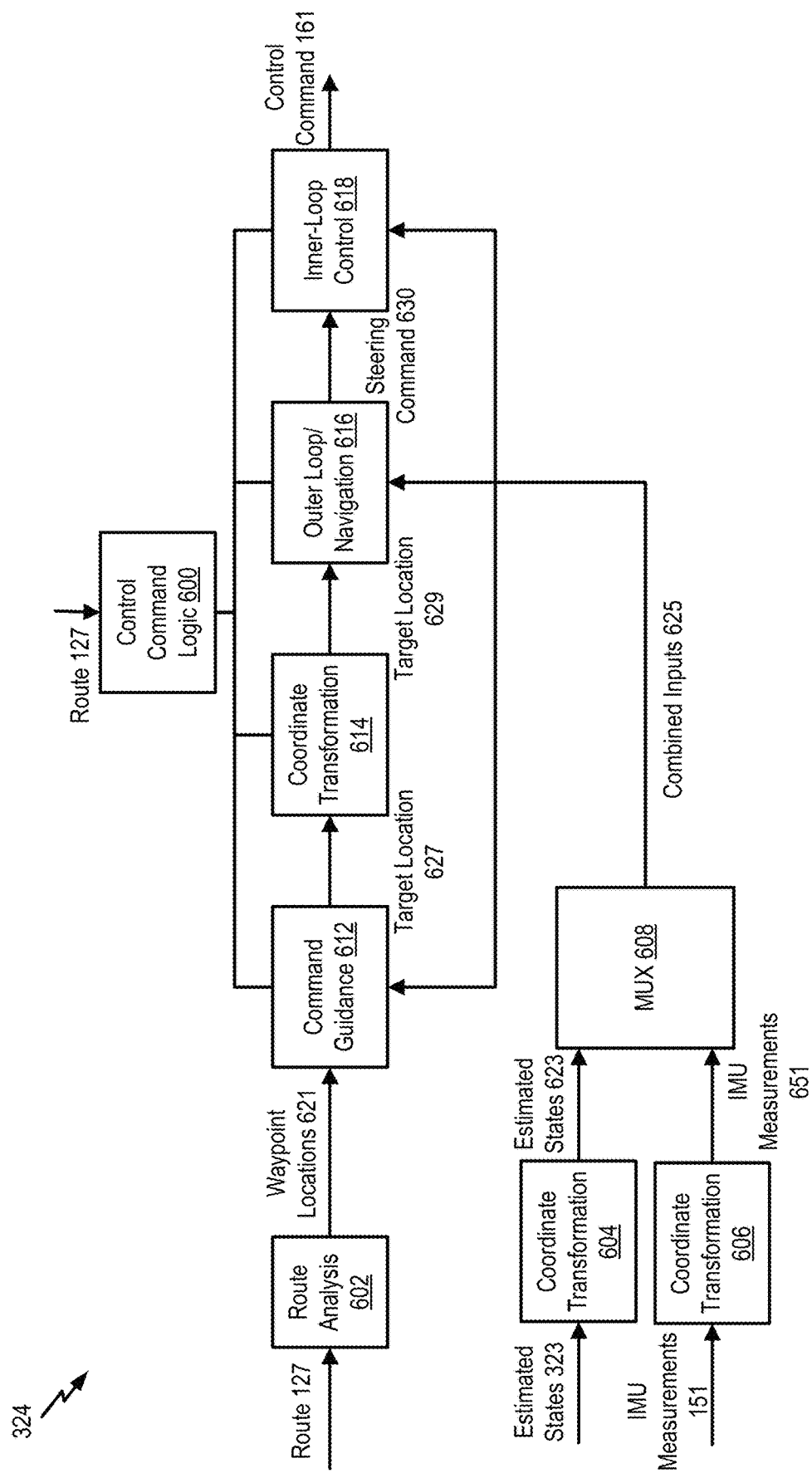
FIG. 6 is a diagram that illustrates an example of a control command generator of the analyzer of FIG. 3.

Referring to FIG. 6, an example of operation of the control command generator 324 is shown. The control command generator 324 is configured to generate the control command 161 based on the estimated states 323, the IMU measurements 151, the route 127, or a combination thereof, as described herein. The control command generator 324 includes control command logic 600. The control command logic 600 is configured to adjust a configuration of the control command generator 324. The control command generator 324 includes a MUX 608.

The control command generator 324 is configured to generate estimated states 623 by performing a coordinate transformation, at 604. For example, the control command generator 324 generates the estimated states 623 by performing a coordinate transformation of the estimated states 323 from the ECEF frame of reference to a control frame of reference.

The control command generator 324 is configured to generate IMU measurements 651 by performing a coordinate transformation, at 606. For example, the control command generator 324 generates the IMU measurements 651 by performing a coordinate transformation of the IMU measurements 151 from the ECEF frame of reference to a control frame of reference.

The MUX 608 is configured to generate combined inputs 625 based on the estimated states 623, the IMU measurements 651, or a combination thereof. For example, the MUX 608 generates the combined inputs 625 as a vector indicating the estimated states 623, the IMU measurements 651, or a combination thereof.

The control command generator 324 generates waypoint locations 621 by performing route analysis, at 602. For example, the control command generator 324 extracts the waypoint locations 621 indicated by the route 127.

The control command generator 324 determines a target location 627 by performing command guidance, at 612. The control command generator 324 determines the target location 627 based on the waypoint locations 621, the combined inputs 625, or a combination thereof. For example, the combined inputs 625 indicate the adjusted position 125 and the control command generator 324 selects one of the waypoint locations 621 that is subsequent to the adjusted position 125 along the route 127. In a particular aspect, the control command generator 324 determines the selected waypoint location as the target location 627. In an alternate aspect, the control command generator 324 determines the target location 627 between the adjusted position 125 and the selected waypoint location. The target location 627 is represented in an ECEF frame of reference.

The control command generator 324 generates a target location 629 by performing a coordinate transformation, at 614. For example, the control command generator 324 generates the target location 629 based on the target location 627. To illustrate, the control command generator 324 generates the target location 629 by performing a coordinate transformation on the target location 627 from the ECEF frame of reference to a control frame of reference. In an alternative aspect, the target location 627 is in the control frame of reference. In this aspect, the control command generator 324 refrains from performing the coordinate transformation, at 614, and the target location 629 is the same as the target location 627.

The control command generator 324 generates a steering command 630 by performing outer loop/navigation, at 616. For example, the control command generator 324 generates the steering command 630 based on the target location 629 and the combined inputs 625. To illustrate, the control command generator 324 determines a navigation target (e.g., a first distance in a first direction) based on a comparison of the adjusted position 125 and the target location 629. The control command generator 324 generates the steering command 630 based on the navigation target and the estimated states 623, the IMU measurements 651, or a combination thereof. For example, the IMU measurements 651 indicate a heading of the vehicle 102. The control command generator 324 determines the steering command 630 (e.g., change heading by first degrees) based on the navigation target (e.g., the first direction) and the IMU measurements (e.g., the heading of the vehicle 102). For example, the steering command 630 indicates that heading is to change by first degrees (e.g., 20 degrees) based on the first direction (e.g., 80 degrees) of the navigation target and the heading (e.g., 60 degrees) of the vehicle 102 indicated by the IMU measurements.

The control command generator 324 generates the control command 161 by performing inner-loop control, at 618. For example, the control command generator 324 generates the control command 161 based on the steering command 630, the estimated states 623, the IMU measurements 651, or a combination thereof. The control command generator 324 determines whether the steering command 630 satisfies a control criterion based on the estimated states 623, the IMU measurements 651, or both. In a particular example, the control command generator 324 determines that the steering command 630 (e.g., a first change in the heading of the vehicle 102) fails to satisfy the control criterion in response to determining that the IMU measurements 651 indicate that the vehicle 102 has a condition (e.g., a pitch attitude, a roll attitude, or a heading) that fails to satisfy a change threshold. In this example, the control command generator 324 generates the control command 161 to change the condition of the vehicle 102 to satisfy the change threshold. Alternatively, the control command generator 324, in response to determining that the steering command 630 satisfies the control criterion, generates the control command 161 to cause the vehicle 102 to change position to perform the steering command 630. The control command generator 324 thus enables automatically changing position of the vehicle 102 based on the adjusted position 125.

Figure 7:
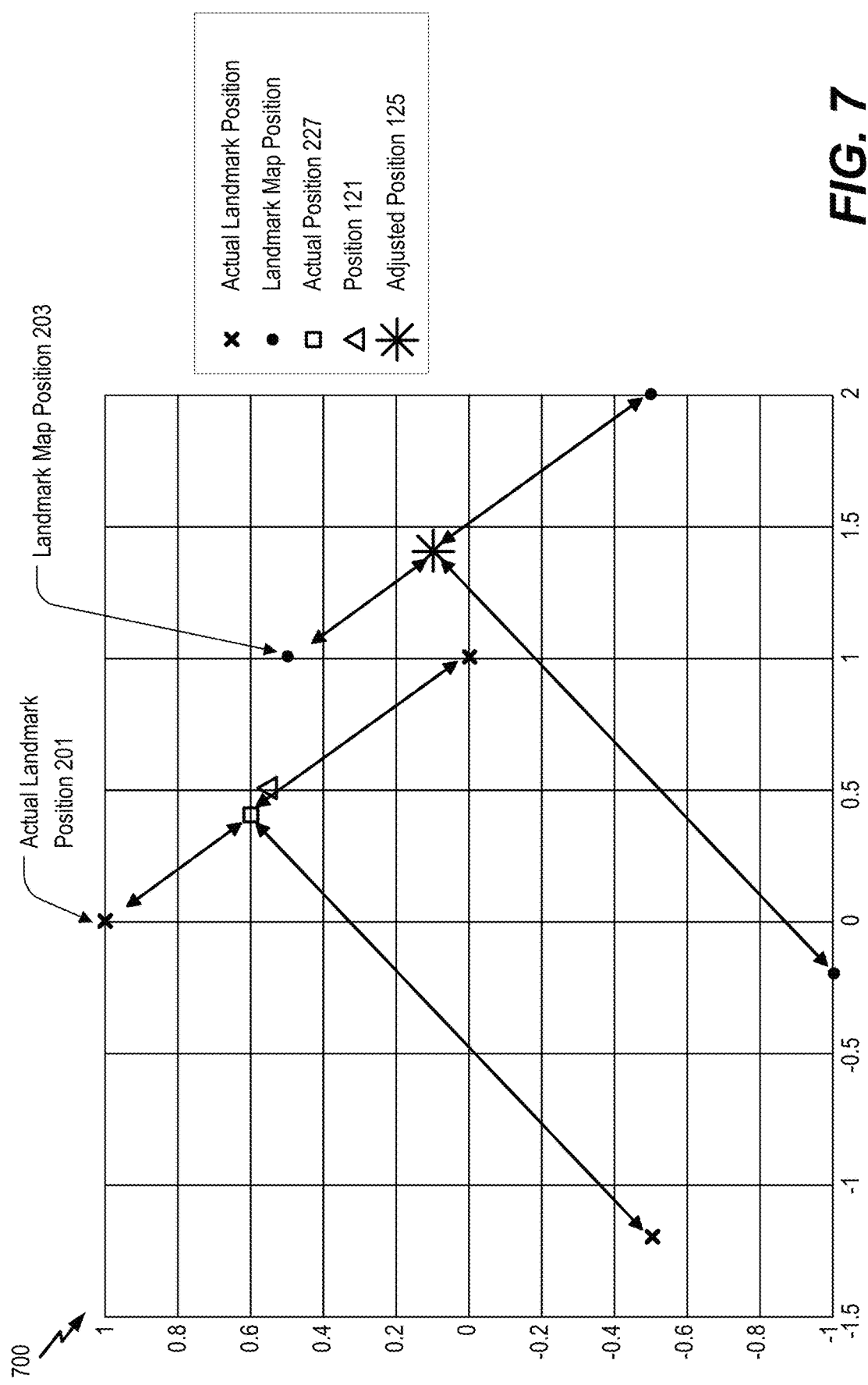
FIG. 7 is a diagram that illustrates an example of position information adjustment performed by the system of FIG. 1.

Referring to FIG. 7, an example of position information adjustment is shown and generally designated 700. In a particular aspect, the position information adjustment is performed by the analyzer 120, the system 100, or both, of FIG. 1.

In the example 700 of FIG. 7, the actual landmark position 201 of the landmark 180 of FIG. 1 is distinct from the landmark map position 203 of the landmark 180. In a particular aspect, the landmark map position 203 differs from the actual landmark position 201 due to errors in the map data 111. The vehicle 102 has the actual position 227.

The analyzer 120 of FIG. 1 determines the first estimate 113 (e.g., an image-based estimate) of a position of the landmark 180 relative to the image sensor 130 of the vehicle 102, as described with reference to FIG. 1. In a particular aspect, the first estimate 113 corresponds to a difference (e.g., −0.4 along the X-axis and +0.4 along the Y-axis) between the actual position 227 and the actual landmark position 201.

The analyzer 120 of FIG. 1 determines the second estimate 115 (e.g., a map-based estimate) of a position of the landmark 180 relative to the image sensor 130, as described with reference to FIG. 1. In a particular aspect, the second estimate 115 corresponds to a difference (e.g., +0.5 along the X-axis and −0.08 along the Y-axis) between the position 121 (e.g., the GPS position) and the landmark map position 203 of the landmark 180.

The analyzer 120 determines the position offset 207 based on a difference (e.g., +0.9 along the X-axis and −0.48 along the Y-axis) between the first estimate 113 (e.g., the image-based estimate) and the second estimate (e.g., the map-based estimate), as described with reference to FIG. 1. The analyzer 120 determines the position offset 211 based on the position offset 207, as described with reference to FIG. 2. The analyzer 120 determines the adjusted position 125 by applying the position offset 211 (e.g., +0.9 along the X-axis and −0.48 along the Y-axis) to the position 121 (e.g., the GPS position).

In a particular aspect, an unadjusted difference refers to a difference between the position 121 and the landmark map position 203, an adjusted difference refers to a difference between the adjusted position 125 and the landmark map position 203, and an actual difference refers to a difference between the actual position 227 and the actual landmark position 201. In this aspect, the adjusted difference is a better approximation (as compared to the unadjusted difference) of the actual difference. In a particular example, the adjusted difference is equal to the actual difference. The adjusted position 125 is more accurate relative to the landmark map position 203 as compared to the position 121 relative to the landmark map position 203. The adjusted position 125 can be used to navigate the vehicle 102 relative to the landmark map position 203. For example, the analyzer 120 generates the output 123 indicating the adjusted position 125 of the vehicle 102 in a map. The map indicates the landmark map position 203 of the landmark 180. In the example illustrated in FIG. 7, a difference between the actual landmark position 201 and the landmark map position 203 indicates inaccuracy of the map data 111. Although the position 121 (e.g., the GPS position) is a better approximation (as compared to the adjusted position 125) of the actual position 227, the adjusted position 125 relative to the landmark map position 203 is a more accurate (as compared to the position 121) representation of the actual position 227 relative to the actual landmark position 201 because of the inaccuracy of the landmark map position 203. The analyzer 120 thus enables navigation of the vehicle 102 relative to the landmark 180 in cases where the landmark map position 203 is inaccurate.

Figure 8:
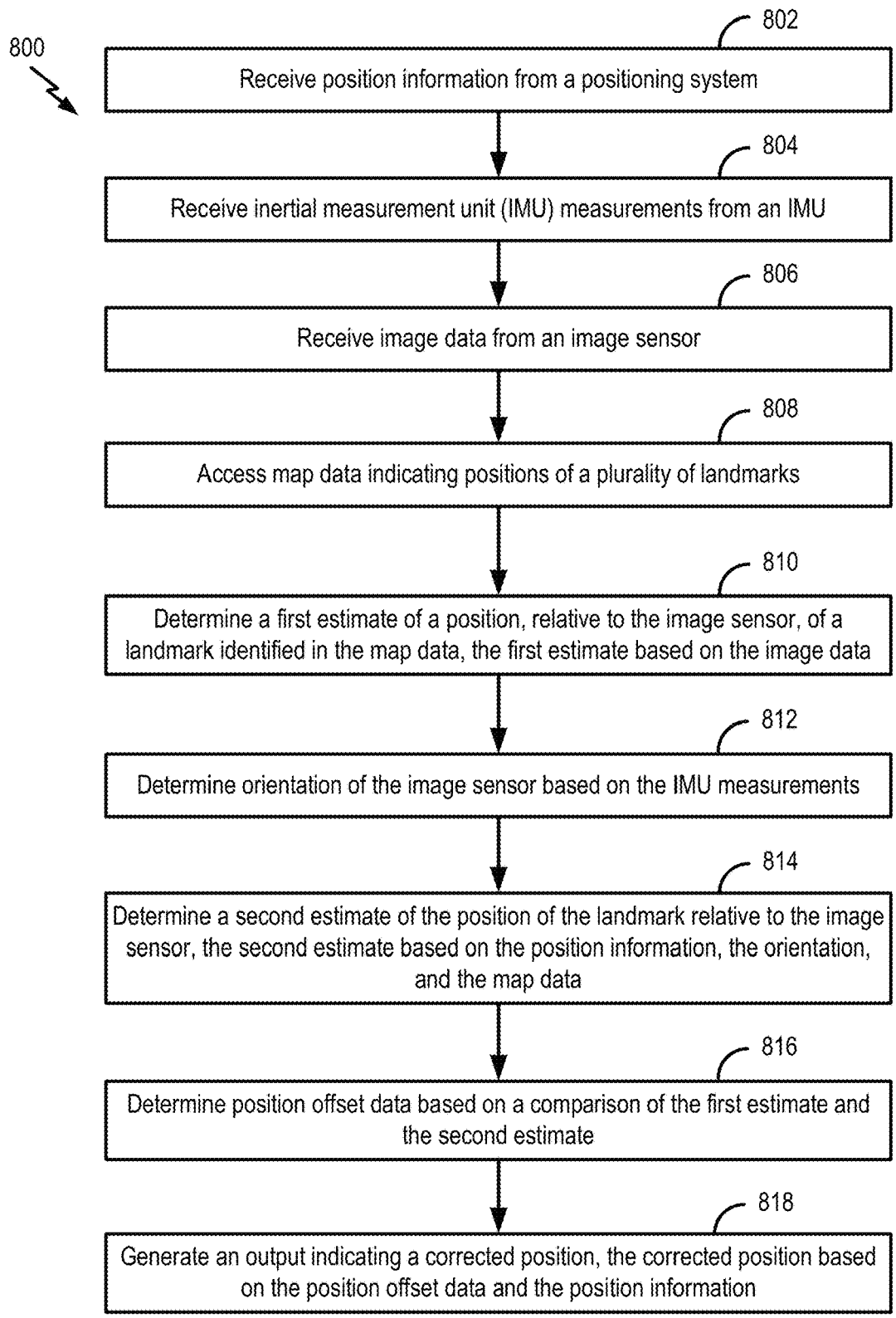
FIG. 8 is a flow chart of an example of a method of adjusting position information.

FIG. 8 is a flowchart of a method 800 of performing position information adjustment. The method 800 may be performed by the analyzer 120, the vehicle 102, the system 100 of FIG. 1, the position estimator 320, the state estimator 322, the control command generator 324 of FIG. 3, the filter mode logic 502, the filter 524 of FIG. 5, the control command logic 600 of FIG. 6, or any combination thereof.

The method 800 includes receiving position information from a positioning system, at 802. For example, the analyzer 120 of FIG. 1 receives the position information 141 from the GPS receiver 140. The position information 141 is based on the GPS signals 143 received by the GPS receiver 140 from the GPS system 142, as further described with reference to FIG. 1.

The method 800 also includes receiving inertial measurement unit (IMU) measurements from an IMU, at 804. For example, the analyzer 120 of FIG. 1 receives the IMU measurements 151 from the IMU 150, as described with reference to FIG. 1.

The method 800 further includes receiving image data from an image sensor, at 806. For example, the analyzer 120 of FIG. 1 receives the image data 131 from the image sensor 130.

The method 800 also includes accessing map data indicating positions of a plurality of landmarks, at 808. For example, the analyzer 120 of FIG. 1 accesses the map data 111. The map data 111 indicates positions of the landmark 180, the landmark 182, the landmark 184, one or more additional landmarks, or a combination thereof. For example, the map data 111 indicates the landmark map position 203 of the landmark 182.

The method 800 further includes determining a first estimate of a position, relative to the image sensor, of a landmark identified in the map data, at 810. For example, the analyzer 120 of FIG. 1 determines the first estimate 113 of a position, relative to the image sensor 130, of the landmark 180, as described with reference to FIG. 1. The first estimate 113 is based on the image data 131.

The method 800 also includes determining orientation of the image sensor based on the IMU measurements, at 812. For example, the analyzer 120 of FIG. 1 determines the image sensor position difference 195 of the image sensor 130 based on the IMU measurements 151, as described with reference to FIGS. 1-2. To illustrate, the analyzer 120 determines the vehicle orientation 191 based on the IMU measurements 151 and determines the image sensor position difference 195 based on the vehicle orientation 191 and the image sensor relative position 193, as described with reference to FIGS. 1-2.

The method 800 further includes determining a second estimate of the position of the landmark relative to the image sensor, at 814. For example, the analyzer 120 of FIG. 1 determines the second estimate 115 of the position of the landmark 180 relative to the image sensor 130, as described with reference to FIG. 1. The second estimate 115 is based on the position information 141, the image sensor position difference 195, the vehicle orientation 191, the image sensor relative position 193, the map data 111, or a combination thereof, as described with reference to FIGS. 1-2.

The method 800 also includes determining position offset data based on a comparison of the first estimate and the second estimate, at 816. For example, the analyzer 120 of FIG. 1 determines the position offset data 119 based on a comparison of the first estimate 113 and the second estimate 115, as described with reference to FIGS. 1 and 4.

The method 800 further includes generating an output indicating an adjusted position, at 818. For example, the analyzer 120 of FIG. 1 generates the output 123 indicating the adjusted position 125, as described with reference to FIG. 1. The adjusted position 125 is based on the position offset data 119 and the position information 141, as described with reference to FIG. 1.

The method 800 thus enables determination of the adjusted position 125 that is more accurate (as compared to the position 121) relative to positions of the landmarks 180-184 as indicated in the map data 111. In a particular aspect, the adjusted position 125 of the vehicle 102 can be used to navigate the vehicle 102 relative to the landmarks 180-184 to follow the route 127.

Figure 9:
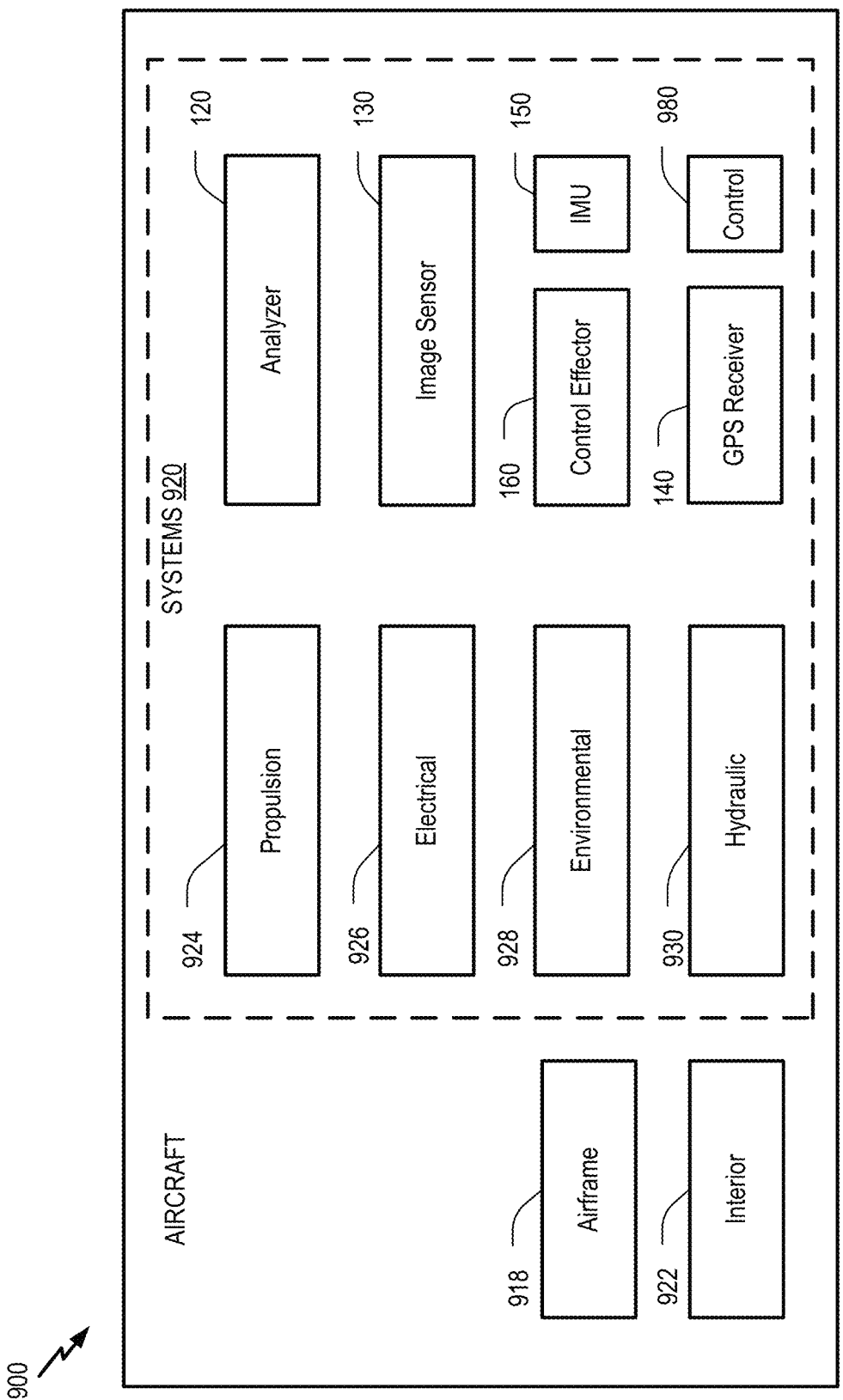
FIG. 9 is a block diagram of a particular example of an aircraft configured to support position information adjustment according to the present disclosure.

Aspects of the disclosure may be described in the context of an aircraft 900 as shown in FIG. 9. The aircraft 900 includes an airframe 918 with a plurality of systems 920 (e.g., high-level systems) and an interior 922. Examples of the systems 920 include one or more of a propulsion system 924, an electrical system 926, an environmental system 928, an hydraulic system 930, the analyzer 120, the image sensor 130, the GPS receiver 140, the IMU 150, the control effector 160, or a control system 980. Other systems could also be included. The control system 980 is configured to control operations of the aircraft 900. For example, the control system 980, in response to receiving the control command 161 of FIG. 1, performs one or more operations to change a position of the aircraft 900.

The analyzer 120 is configured to support aspects of computer-implemented methods and computer-executable program instructions (or code) according to the present disclosure. For example, the analyzer 120, or portions thereof, is configured to execute instructions to initiate, perform, or control one or more operations described with reference to FIGS. 1-9. Although an aerospace example is shown, the present disclosure can be applied to other industries. For example, the analyzer 120, the image sensor 130, the GPS receiver 140, the IMU 150, the control effector 160, the control system 980, or a combination thereof, can be used onboard a manned or unmanned vehicle (such as a satellite, a watercraft, or a land-based vehicle), in a building or other structure.

Although one or more of FIGS. 1-9 illustrate systems, apparatuses, and/or methods according to the teachings of the disclosure, the disclosure is not limited to these illustrated systems, apparatuses, and/or methods. One or more functions or components of any of FIGS. 1-9 as illustrated or described herein may be combined with one or more other portions of another of FIGS. 1-9. For example, one or more elements of the method 800 of FIG. 8 may be performed in combination with other operations described herein. Accordingly, no single implementation described herein should be construed as limiting and implementations of the disclosure may be suitably combined without departing form the teachings of the disclosure. As an example, one or more operations described with reference to FIGS. 1-8 may be optional, may be performed at least partially concurrently, and/or may be performed in a different order than shown or described.

Examples described above are illustrative and do not limit the disclosure. It is to be understood that numerous modifications and variations are possible in accordance with the principles of the present disclosure.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system comprising:
a memory configured to store map data indicating positions of a plurality of landmarks; and
a processor configured to:
receive position information from a positioning system;
receive inertial measurement unit (IMU) measurements from an IMU;
receive image data from an image sensor;
determine, based on the image data, a first estimate of a position, relative to the image sensor, of a landmark identified in the map data;
determine orientation of the image sensor based on the IMU measurements;
determine, based on the position information, the orientation, and the map data, a second estimate of the position of the landmark relative to the image sensor;
determine a first position offset of the landmark based on a difference between the first estimate and the second estimate;
determine a second position offset of the landmark based on the first position offset and the orientation; and
generate, based on position offset data and the position information, an output indicating an adjusted position, wherein the position offset data is based on the second position offset.

2. The system of claim 1, wherein the position information includes global positioning system (GPS) coordinates.

3. The system of claim 1, wherein the map data indicates global positioning system (GPS) coordinates of each of the plurality of landmarks.

4. The system of claim 1, wherein the processor is further configured to send, based on the adjusted position, a control command to a control effector of an aircraft.

5. The system of claim 1, wherein the processor is integrated into a line-replaceable unit (LRU) of an aircraft.

6. The system of claim 1, wherein the processor is further configured to:
generate a control command based on a mission route and the adjusted position; and
send the control command to a control system of an aircraft.

7. The system of claim 1, wherein the processor is further configured to:
generate a control command based on a waypoint location and the adjusted position; and
send the control command to a control system of an aircraft.

8. The system of claim 1, wherein the orientation is based on a pitch attitude, a roll attitude, and a heading.

9. The system of claim 1, wherein the processor is further configured to determine first position offsets of the plurality of landmarks, wherein the first position offsets include the first position offset of the landmark, and wherein the position offset data is based on an average of the first position offsets.

10. The system of claim 1, wherein the IMU measurements include an inertial body attitude measurement and a motion measurement.

11. The system of claim 1, wherein the processor is further configured to:
determine a conditioned position offset by applying a filter to the second position offset; and
determine that the conditioned position offset satisfies a threshold,
wherein the position offset data is based on the conditioned position offset.

12. The system of claim 11, wherein the processor is further configured to:
determine a plurality of conditioned position offsets associated with the plurality of landmarks, wherein the plurality of conditioned position offsets includes the conditioned position offset; and
in response to determining that the conditioned position offset satisfies the threshold, determining an average position offset based on the plurality of conditioned position offsets, wherein the position offset data includes the average position offset.

13. The system of claim 1, wherein the image sensor includes at least one of an electro-optical sensor, an infra-red sensor, or a light detection and ranging (LIDAR) sensor.

14. A method of adjusting position information, the method comprising:
receiving, at a device, position information from a positioning system;
receiving, at the device, inertial measurement unit (IMU) measurements from an IMU;
receiving, at the device, image data from an image sensor;
accessing map data indicating positions of a plurality of landmarks;
determining, at the device, a first estimate of a position, relative to the image sensor, of a landmark identified in the map data, the first estimate based on the image data;
determining, at the device, orientation of the image sensor based on the IMU measurements;
determining, at the device, a second estimate of the position of the landmark relative to the image sensor, the second estimate based on the position information, the orientation, and the map data;
determining, at the device, a first position offset of the landmark based on a difference between the first estimate and the second estimate;
determining, at the device, a second position offset of the landmark based on the first position offset and the orientation; and
generating, at the device, an output indicating an adjusted position, the adjusted position based on position offset data and the position information, wherein the position offset data is based on the second position offset.

15. The method of claim 14, wherein the orientation is based on a pitch attitude, a roll attitude, and a heading.

16. The method of claim 14, further comprising:
determining, at the device, a conditioned position offset based on applying a filter to the second position offset; and
determining, at the device, that the conditioned position offset satisfies a threshold, wherein the position offset data is based on the conditioned position offset.

17. The method of claim 16, further comprising:
generating a plurality of conditioned position offsets associated with the plurality of landmarks, wherein the plurality of conditioned position offsets includes the conditioned position offset; and
in response to determining that the conditioned position offset satisfies the threshold, generating an average position offset based on the plurality of conditioned position offsets, wherein the position offset data includes the average position offset.

18. A computer-readable storage device storing instructions that, when executed by a processor, cause the processor to perform operations comprising:
- receiving position information from a positioning system;
- receiving inertial measurement unit (IMU) measurements from an IMU;
- receiving image data from an image sensor;
- accessing map data indicating positions of a plurality of landmarks;
- determining, based on the image data, a first estimate of a position, relative to the image sensor, of a landmark identified in the map data;
- determining orientation of the image sensor based on the IMU measurements;
- determining, based on the position information, the orientation, and the map data, a second estimate of the position of the landmark relative to the image sensor;
- determining a first position offset of the landmark based on a difference between the first estimate and the second estimate;
- determining a second position offset of the landmark based on the first position offset and the orientation; and
- generating, based on position offset data and the position information, an output indicating an adjusted position, wherein the position offset data is based on the second position offset.

19. The computer-readable storage device of claim 18, wherein the operations further include:
- determining estimated states by applying a filter to the adjusted position, a velocity measurement, and an acceleration measurement, wherein the IMU measurements include the velocity measurement, the acceleration measurement, or both;
- generating a control command based on the estimated states and a route; and
- sending the control command to a control system.

20. The computer-readable storage device of claim 18, wherein the IMU measurements include an inertial body attitude measurement and a motion measurement.

* * * * *